US012131848B2

(12) United States Patent
Ravindranathan et al.

(10) Patent No.: US 12,131,848 B2
(45) Date of Patent: Oct. 29, 2024

(54) VARISTOR HAVING FLEXIBLE TERMINATIONS

(71) Applicant: KYOCERA AVX Components Corporation, Fountain Inn, SC (US)

(72) Inventors: Palaniappan Ravindranathan, Simpsonville, SC (US); Marianne Berolini, Greenville, SC (US); Michael W. Kirk, Simpsonville, SC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 88 days.

(21) Appl. No.: 17/582,631

(22) Filed: Jan. 24, 2022

(65) Prior Publication Data

US 2022/0246334 A1 Aug. 4, 2022

Related U.S. Application Data

(60) Provisional application No. 63/144,057, filed on Feb. 1, 2021.

(51) Int. Cl.
*H01C 7/112* (2006.01)
*H01C 1/148* (2006.01)
*H01C 17/28* (2006.01)

(52) U.S. Cl.
CPC ............ *H01C 7/112* (2013.01); *H01C 1/148* (2013.01); *H01C 17/28* (2013.01)

(58) Field of Classification Search
CPC .......... H01C 7/112; H01C 7/102; H01C 7/18; H01C 17/28; H01C 17/283; H01C 1/148
See application file for complete search history.

(56) References Cited

U.S. PATENT DOCUMENTS 4,436,650 A * 3/1984 Bowen .................. H01C 7/112 338/21
6,400,253 B1 6/2002 Jinno et al.
(Continued)

FOREIGN PATENT DOCUMENTS

JP 2001068307 3/2001
KR 20170092254 * 8/2017
(Continued)

OTHER PUBLICATIONS

KR-20170092254, machine translation. (Year: 2017).*
(Continued)

*Primary Examiner* — Kyung S Lee
(74) *Attorney, Agent, or Firm* — Dority & Manning, P.A.

(57) ABSTRACT

A varistor can include a monolithic body including a plurality of dielectric layers stacked in a Z-direction that is perpendicular to a longitudinal direction. The monolithic body can have a first end and a second end that is spaced apart from the first end in the longitudinal direction. A first external terminal can be disposed along the first end. A second external terminal can be disposed along the second end. A first plurality of electrodes can be connected with the first external terminal and can extend from the first end towards the second end of the monolithic body. A second plurality of electrodes can be connected with the second external terminal and can extend from the second end towards the first end of the monolithic body. At least one of the first external terminal or the second external terminal can include a conductive polymeric composition.

23 Claims, 9 Drawing Sheets

(56) References Cited

U.S. PATENT DOCUMENTS

| | | | | |
|---|---|---|---|---|
| 9,472,342 | B2 * | 10/2016 | McConnell | B23K 35/0227 |
| 10,937,575 | B2 * | 3/2021 | Kirk | H01C 1/148 |
| 2001/0035810 | A1 | 11/2001 | Heist et al. | |
| 2019/0304636 | A1 | 10/2019 | Kirk et al. | |
| 2019/0333700 | A1 * | 10/2019 | Cho | H01G 4/30 |
| 2020/0343046 | A1 | 10/2020 | Hodgkinson et al. | |

FOREIGN PATENT DOCUMENTS

| | | | | |
|---|---|---|---|---|
| WO | WO-2019035559 | * | 2/2019 | H01C 7/10 |
| WO | WO-2019040753 A1 | * | 2/2019 | B23K 1/0008 |

OTHER PUBLICATIONS

WO2019035559, machine translation. (Year: 2019).*

International Search Report for PCT/US2022/013505 dated May 10, 2022, 8 pages.

* cited by examiner

VARISTOR HAVING FLEXIBLE TERMINATIONS

CROSS REFERENCE TO RELATED APPLICATION

The present application claims filing benefit of U.S. Provisional Patent Application Ser. No. 63/144,057 having a filing date of Feb. 1, 2021, which is incorporated herein by reference in its entirety.

BACKGROUND OF THE INVENTION

The present subject matter generally relates to electronic components adapted to be mounted on a circuit board and more particularly to a varistor and varistor array.

Multilayer ceramic devices, such as varistors, are typically constructed with a plurality of stacked dielectric-electrode layers. During manufacture, the layers may often be pressed and formed into a vertically stacked structure. Multilayer ceramic devices can include a single electrode or multiple electrodes in an array.

Varistors are voltage-dependent nonlinear resistors and have been used as surge absorbing electrodes, arresters, and voltage stabilizers. Varistors may be connected, for example, in parallel with sensitive electrical components. The non-linear resistance response of varistors is often characterized by a parameter known as the clamping voltage. For applied voltages less than the clamping voltage of a varistor, the varistor generally has very high resistance and, thus, acts similar to an open circuit. When the varistor is exposed to voltages greater than its clamping voltage, however, its resistance is reduced such that the varistor acts more similar to a short circuit and allows a greater flow of current. This non-linear response may be used to divert current surges and/or prevent voltage spikes from damaging sensitive electronic components.

Varistors can be subjected to substantially mechanical stress and/or thermal stress. Varistors can be surface mounted to substrates such as printed circuit boards. When the substrate is bent or flexed, the varistor can fracture or become disconnected from the substrate. Thermal fluctuations can cause the varistor and/or the substrate to expand and contract, similarly causing damage or failure of the varistor.

SUMMARY OF THE INVENTION

In accordance with one embodiment of the present disclosure, a varistor can include a monolithic body including a plurality of dielectric layers stacked in a Z-direction that is perpendicular to a longitudinal direction. The monolithic body can have a first end and a second end that is spaced apart from the first end in the longitudinal direction. A first external terminal can be disposed along the first end. A second external terminal can be disposed along the second end. A first plurality of electrodes can be connected with the first external terminal and can extend from the first end towards the second end of the monolithic body. A second plurality of electrodes can be connected with the second external terminal and can extend from the second end towards the first end of the monolithic body. At least one of the first external terminal or the second external terminal can include a conductive polymeric composition.

In accordance with another embodiment of the present disclosure, a method of forming a varistor can include forming a first plurality of electrodes respectively on a first plurality of dielectric layers; forming a second plurality of electrodes on a second plurality of dielectric layers; stacking the first plurality of dielectric layers and second plurality of dielectric layers in a Z-direction that is perpendicular a longitudinal direction to form a monolithic body such that the first plurality of electrodes extend from a first end of the monolithic body and such that the second plurality of electrodes extend from a second end of the monolithic body; forming a first external terminal along the first end of the monolithic body that is connected with the first plurality of electrodes; and forming a second external terminal along the second end of the monolithic body that is connected with the second plurality of electrodes. At least one of the first external terminal or the second external terminal can include a conductive polymeric composition.

BRIEF DESCRIPTION OF THE DRAWINGS

A full and enabling disclosure of the present subject matter, including the best mode thereof, directed to one of ordinary skill in the art, is set forth in the specification, which makes reference to the appended Figures, in which.

Figure 1:
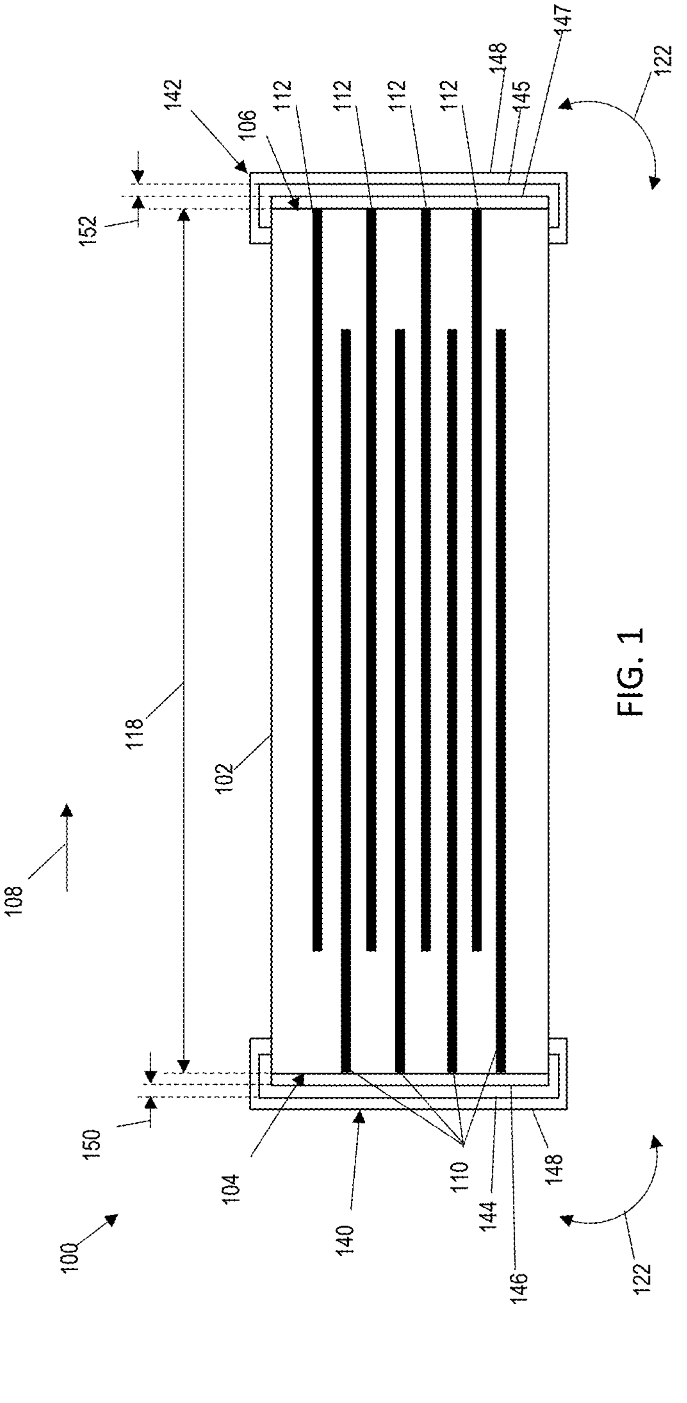
FIG. 1 illustrates a cross-section view of one embodiment of a varistor including a compliant layer according to aspects of the present disclosure.

Repeat use of reference characters throughout the present specification and appended drawings is intended to represent same or analogous features, electrodes, or steps of the present subject matter.

DETAILED DESCRIPTION OF THE PREFERRED EMBODIMENTS

It is to be understood by one skilled in the art that the present disclosure is a description of exemplary embodiments only and is not intended as limiting the broader aspects of the present subject matter, which broader aspects are embodied in the exemplary constructions.

Generally, the present disclosure is directed to a varistor having flexible terminations. The terminations of the varistor can include respective compliant layers to reduce the stress experienced by the component. The compliant layer(s) can include a conductive polymeric composition, which can include a polymer and dispersed conductive particles.

In particular, the present invention is directed to a varistor containing alternating dielectric layers and electrode layers within a single, monolithic body. The monolithic body of the varistor may include a monolithic body comprising a plurality of dielectric layers stacked in a Z-direction that is perpendicular to a longitudinal direction, the monolithic body having a first end and a second end that is spaced apart from the first end in the longitudinal direction. For instance, the monolithic body of the varistor may have a parallelepiped shape, such as a rectangular parallelepiped shape.

The varistor can include a first external terminal disposed along the first end and a second external terminal disposed along the second end of the monolithic body. A first plurality of electrodes can be connected with the first external terminal and can extend from the first end towards the second end of the monolithic body. A second plurality of electrodes connected with the second external terminal and extending from the second end towards the first end of the monolithic body. At least one of the first external terminal or the second external terminal can include a conductive polymeric composition. The conductive polymeric composition can be a compliant layer of the first external termination and/or the second external termination.

The conductive polymeric composition may include one or more suitable polymeric materials. Examples include, for instance, epoxy resins, polyimide resins, melamine resins, urea-formaldehyde resins, polyurethane resins, phenolic resins, polyester resins, etc. Epoxy resins are particularly suitable. Examples of suitable epoxy resins include, for instance, bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins, etc. The polymer may include a thermoset or thermoplastic resin.

The conductive polymeric composition may include conductive particles, which may be dispersed within the polymer (e.g., as a polymer matrix) and may improve the electrical conductivity of the compliant layer. The conductive particles may be or include a metal, such as silver, gold, copper, etc. For example, conductive particles may be or include silver, copper, gold, nickel, tin, titanium, or other conductive metals. Thus, in some embodiments the compliant layer may include a silver-filled polymer, nickel-filled polymer, copper-filled polymer etc.

However, in other embodiments, the conductive particles may include a conductive ceramic material, such as an oxide of aluminum (e.g., alumina) and/or nitrides of aluminum, etc. Additional examples include oxide or nitrides of other metals, such as titanium. In some embodiments, the conductive particles may include a layer of conductive material over a base material. For instance, the conductive particles may include a layer of precious metal (e.g., silver, gold, etc.) over a base metal (e.g., copper).

The conductive particles may have a thermal conductivity that is greater than about 10 W/(m·K), in some embodiments greater than about 20 W/(m·K), in some embodiments greater than about 50 W/(m·K), in some embodiments greater than about 100 W/(m·K), in some embodiments greater than about 200 W/(m·K), in some embodiments greater than about 200 W/(m·K).

The compliant layer may have a Young's modulus that is less than about 3 GPa as tested in accordance with ASTM D638-14 at about 23° C. and 20% relative humidity, in some embodiments less than about 1 GPa, in some embodiments less than about 500 MPa, in some embodiments less than about 100 MPa, in some embodiments less than about 50 MPa, and in some embodiments less than about 15 MPa.

The compliant layer may exhibit low electrical resistance. For example, the compliant layer may exhibit a volume resistivity that is less than about 0.01 ohm-cm tested in accordance with ASTM B193-16, in some embodiments less than about 0.001 ohm-cm, and in some embodiments about 0.0001 ohm-cm or less.

The compliant layer of the external terminations may be formed by dipping the monolithic body into a conductive polymeric composition solution to form a thick-film layer of the conductive polymeric composition.

The external terminations may include base layers formed between the monolithic body and the compliant layer. For example, the base layers may be formed over respective ends of the monolithic body, and the compliant layers may be formed over the respective base layers. The base layers may include a variety of suitable conductive materials. For example, the base layers may include copper, nickel, tin, silver, gold, etc. The base layers may be formed by dipping the monolithic body into a solution to form a thick-film layer of the base layer material. However, in other embodiments, the base layers may be formed using a suitable plating process, for example, as described below.

One or more plated layers may be formed over the compliant layer. For example, in some embodiments, a first plated layer may be formed over the compliant layer. A second plated layer may be formed over the first plated layer. The first and second plated layers may include a variety of suitable conductive metals, such as nickel, tin, copper, etc. For instance, in one embodiment, the first plated layer may include nickel. The second plated layer may include tin.

The plated layers may be formed by a variety of plating techniques including electroplating and electroless plating. For instance, electroless plating may first be employed to deposit an initial layer of material. The plating technique may then be switched to an electrochemical plating system which may allow for a faster buildup of material.

The plating solution contains a conductive material, such as a conductive metal, employed to form the plated termination. Such conductive material may be any of the aforementioned materials or any as generally known in the art. For instance, the plating solution may be a nickel sulfamate bath solution or other nickel solution such that the plated layer and external terminal comprise nickel. Alternatively, the plating solution may be a copper acid bath or other suitable copper solution such that the plated layer and external terminal comprise copper.

Additionally, it should be understood that the plating solution may comprise other additives as generally known in the art. For instance, the additives may include other organic additives and media that can assist in the plating process. Additionally, additives may be employed in order to employ the plating solution at a desired pH. In one embodiment, resistance-reducing additives may be employed in the solutions to assist with complete plating coverage and bonding of the plating materials to the varistor and exposed leading edges of the lead tabs.

The varistor may be exposed, submersed, or dipped in the plating solution for a predetermined amount of time. Such exposure time is not necessarily limited but may be for a sufficient amount of time to allow for enough plating material to deposit in order to form the plated terminal. In this regard, the time should be sufficient for allowing the formation of a continuous connection among the desired exposed, adjacent leading edges of lead tabs of a given polarity of the respective electrode layers within a set of alternating dielectric layers and electrode layers.

In general, the difference between electrolytic plating and electroless plating is that electrolytic plating employs an electrical bias, such as by using an external power supply. The electrolytic plating solution may be subjected typically to a high current density range, for example, ten to fifteen amp/$ft^2$ (rated at 9.4 volts). A connection may be formed with a negative connection to the varistor requiring formation of the plated terminals and a positive connection to a solid material (e.g., Cu in Cu plating solution) in the same plating solution. That is, the varistor is biased to a polarity opposite that of the plating solution. Using such method, the conductive material of the plating solution is attracted to the metal of the exposed leading edge of the lead tabs of the electrode layers.

Prior to submersing or subjecting the varistor to a plating solution, various pretreatment steps may be employed. Such steps may be conducted for a variety of purposes, including to catalyze, to accelerate, and/or to improve the adhesion of the plating materials to the leading edges of the lead tabs.

Additionally, prior to plating or any other pretreatment steps, an initial cleaning step may be employed. Such step may be employed to remove any oxide buildup that forms on the exposed lead tabs of the electrode layers. This cleaning step may be particularly helpful to assist in removing any buildup of nickel oxide when the internal electrodes or other conductive elements are formed of nickel. Component cleaning may be effected by full immersion in a preclean bath, such as one including an acid cleaner. In one embodiment, exposure may be for a predetermined time, such as on the order of about 10 minutes. Cleaning may also alternatively be effected by chemical polishing or harperizing steps.

In addition, a step to activate the exposed metallic leading edges of the lead tabs of the electrode layers may be performed to facilitate depositing of the conductive materials. Activation can be achieved by immersion in palladium salts, photo patterned palladium organometallic precursors (via mask or laser), screen printed or ink-jet deposited palladium compounds or electrophoretic palladium deposition. It should be appreciated that palladium-based activation is presently disclosed merely as an example of activation solutions that often work well with activation for exposed tab portions formed of nickel or an alloy thereof. However, it should be understood that other activation solutions may also be utilized.

Also, in lieu of or in addition to the aforementioned activation step, the activation dopant may be introduced into the conductive material when forming the electrode layers of the varistor. For instance, when the electrode layer comprises nickel and the activation dopant comprises palladium, the palladium dopant may be introduced into the nickel ink or composition that forms the electrode layers. Doing so may eliminate the palladium activation step. It should be further appreciated that some of the above activation methods, such as organometallic precursors, also lend themselves to co-deposition of glass formers for increased adhesion to the generally ceramic body of the varistor. When activation steps are taken as described above, traces of the activator material may often remain at the exposed conductive portions before and after termination plating.

Additionally, post-treatment steps after plating may also be employed. Such steps may be conducted for a variety of purposes, including enhancing and/or improving adhesion of the materials. For instance, a heating (or annealing) step may be employed after performing the plating step. Such heating may be conducted via baking, laser subjection, UV exposure, microwave exposure, arc welding, etc.

The external terminals may have a total average thickness of about 25 μm or more, such as about 35 μm or more, such as about 50 μm or more, such as about 75 or more μm. For instance, the external terminals may have an average thickness of from about 25 μm to about 150 μm, such as from about 35 μm to about 125 μm, such as from about 50 μm to about 100 μm.

The external terminations may have a maximum thickness of about 200 μm or less, such as about 150 μm or less, such as about 125 μm or less, such as about 100 μm or less, such as about 80 μm or less. The external terminations may have a maximum thickness of about 25 μm or more, such as about 35 μm or more, such as about 50 μm or more, such as about 75 or more μm. For instance, the external terminations may have a maximum thickness of from about 25 μm to about 150 μm, such as from about 35 μm to about 125 μm, such as from about 50 μm to about 100 μm.

The base layer may have an average thickness that ranges from about 3 μm to about 125 μm, or more, in some embodiments from about 5 μm to about 100 μm, in some embodiments from about 10 μm to about 80 μm. The compliant layer may have an average thickness that ranges from about 3 μm to about 125 μm, or more, in some embodiments from about 5 μm to about 100 μm, in some embodiments from about 10 μm to about 80 μm.

In some embodiments, a varistor in accordance with aspects of this disclosure may also exhibit low capacitance. For example, the varistor may have a capacitance less than about 50 picoFarads ("pF") with a DC bias of 0.0 volts and a 0.5 volt root-mean-squared sinusoidal signal at an operating frequency of 1,000 Hz, a temperature of about 23° C., and a relative humidity of 25%. For example, in some embodiments, the varistor may have a capacitance less than about 45 pF in the above conditions, in some embodiments less than about 40 pF, in some embodiments less than about 10 pF, and in some embodiments, the varistor may have a capacitance less than about 5 pF in the above conditions, in some embodiments less than about 2 pF, and in some embodiments less than about 1 pF. For example, in some embodiments, the varistor may have a capacitance ranging from about 0.1 pF to about 50 pF, in some embodiments from about 0.1 pF to about 10 pF, in some embodiments from about 0.7 pF to about 5 pF, and in some embodiments from about 0.1 pF to about 1 pF.

A varistor in accordance with aspects of this disclosure may also exhibit other capacitance values. For instance, the varistor may have a capacitance greater than about 50 ("pF") with a DC bias of 0.0 volts and a 0.5 volt root-mean-squared sinusoidal signal at an operating frequency of 1,000 Hz, a temperature of about 23° C., and a relative humidity of 25%. For example, in some embodiments, the varistor may have a capacitance greater than about 75 pF in the above conditions, in some embodiments greater than about 100 pF, in some embodiments greater than about 200 pF, in some embodiments greater than about 300 pF, in some embodiments greater than about 400 pF, and in some embodiments greater than about 500 pF. As further examples, the varistor may have a capacitance greater than about 1000 pF in the above conditions, in some embodiments greater than about 1500 pF, in some embodiments greater than about 2000 pF, in some embodiments greater than about 2500 pF, in some embodiments greater than about 3000 pF, and in some embodiments greater than about 3500 pF. For example, in some embodiments, the varistor may have a capacitance ranging from about 50 pF to about 3500 pF, in some embodiments from about 75 pF to about 3250 pF, and in some embodiments from about 90 pF to about 3000 pF.

In some embodiments, the varistor may exhibit a low leakage current. For example, the leakage current at an operating voltage of about 30 volts may be less than about 10 microamperes (μA). For example, in some embodiments, the leakage current at an operating voltage of about 30 volts may range from 0.01 μA to about 5 μA, in some embodiments, from about 0.005 μA to about 1 μA, in some embodiments, from about 0.05 μA to about 0.15 μA, e.g., 0.1 μA.

In some embodiments, the varistor may have a transient energy capability per unit active volume at least about 0.05 J/mm$^3$ when tested with a 10×1000 μs current wave, in some embodiments at least about 0.1 J/mm$^3$, in some embodiments at least about 0.2 J/mm$^3$, and in some embodiments at least about 1.0 J/mm$^3$. The transient energy capability per unit active volume of the varistor can be determined by dividing the transient energy capability of the varistor by the active volume of the varistor. The active volume of the varistor can be defined as an area of the active electrodes multiplied by a number of the active electrodes and multiplied by a thickness of the dielectric layers between the active electrodes.

According to aspects of the present disclosure, the varistor can exhibit a non-linear resistance response that can divert voltage spikes and/or divert current voltages from damaging nearby or connected electrical components. For example, the varistor can be configured to provide relatively low current flow for voltages applied across the varistor that are below a breakdown voltage of the varistor. As the applied voltage increases over the breakdown voltage, the varistor may facilitate greater relative current flow through the varistor, which can prevent or reduce voltage spikes across the varistor thereby preventing or reducing voltage spikes for nearby or adjacent components.

For example, the varistor can exhibit resistance according to a first resistance curve that is non-linear across a first voltage range, the first voltage range being less than a breakdown voltage of the varistor, and exhibit resistance according to a second resistance curve that is approximately linear across a second voltage range that is greater than the breakdown voltage range.

The varistor may exhibit a non-linear response. A voltage per unit length across the varistor can vary with respect to a current per unit area through the varistor. Across a prebreakdown voltage range, the varistor may generally exhibit a first response curve and a second response curve across a non-linear voltage range that is less than a breakdown voltage range; the varistor may generally exhibit voltages approximately according to the following relationship:

$$I = \left(\frac{V}{C}\right)^{\alpha}$$

where V represents voltage; I represents current; C is a constant; and a is defined as follows in the nonlinear region:

$$\alpha = \frac{d\ln I}{d\ln V}$$

In the prebreakdown voltage range, the voltage per unit length generally increases faster with respect to the current per unit area through the varistor than in the non-linear region. Across an upturn voltage range that is greater than the breakdown voltage range, the varistor may generally exhibit a third response curve, in which the voltage per unit length generally increases faster with respect to the current per unit area through the varistor than in the non-linear region.

In some embodiments, a varistor according to aspects of the present disclosure may be capable of withstanding repetitive electrostatic discharge strikes without substantial degradation in performance. For example, a breakdown voltage of the varistor after 5,000 or more electrostatic discharge strikes of about 8,000 volts may be greater than about 0.9 times an initial breakdown voltage of the varistor, in some embodiments greater than about 0.95 times the initial breakdown voltage, and in some embodiments greater than about 0.98 times the initial breakdown voltage.

The dielectric layers may be pressed together and sintered to form a unitary structure. The dielectric layers may include any suitable dielectric material, such as, for instance, barium titanate, zinc oxide, or any other suitable dielectric material. Various additives may be included in the dielectric material, for example, that produce or enhance the voltage-dependent resistance of the dielectric material. For example, in some embodiments, the additives may include oxides of cobalt, bismuth, manganese, praseodymium, or combinations thereof. In some embodiments, the additives may include oxides of gallium, aluminum, antimony, chromium, titatnium, lead, barium, nickel, vanadium, tin, or combinations thereof. The dielectric material may be doped with the additive(s) ranging from about 0.5 mole percent to about 3 mole percent, and in some embodiments from about 1 mole percent to about 2 mole percent. The average grain size of the dielectric material may contribute to the non-linear properties of the dielectric material. In some embodiments, the average grain size may range from about 1 microns to 100 microns, in some embodiments, from about 2 microns to 80 microns.

The varistor of the present disclosure can exhibit excellent strength and durability when subjected to mechanical stress. For example, the varistor can withstand greater than about 3 mm of deflection for at least about 60 seconds when subjected to a board flex test according to AEC-Q200-005 without mechanical failure, in some embodiments greater than about 5 mm of deflection, in some embodiments greater than about 7 mm of deflection, in some embodiments greater than 9 mm of deflection, and in some embodiments greater than about 10 mm of deflection.

Various performance characteristics of the varistor can be minimally affected by such mechanical stresses. For example, the varistor can exhibit a change in leakage current that is less than about 5% after being subjected to a board flex test according to AEC-Q200-005 with a deflection of about 3 mm for at least about 60 seconds, in some embodiments greater than about 5 mm of deflection, in some embodiments greater than about 7 mm of deflection, in some embodiments greater than 9 mm of deflection, and in some embodiments greater than about 10 mm of deflection. In some embodiments, the varistor can exhibit a change in leakage current that is less than about 4%, less than about 3%, or less than about 2% after being subjected to a board flex test according to AEC-Q200-005 with a deflection of about 3 mm for at least about 60 seconds, in some embodiments greater than about 5 mm of deflection, in some embodiments greater than about 7 mm of deflection, in some embodiments greater than 9 mm of deflection, and in some embodiments greater than about 10 mm of deflection.

As another example, the varistor can exhibit a change in capacitance that is less than about 5% after being subjected to a board flex test according to AEC-Q200-005 with a deflection of about 3 mm for at least about 60 seconds, in some embodiments greater than about 5 mm of deflection, in some embodiments greater than about 7 mm of deflection, in some embodiments greater than 9 mm of deflection, and in some embodiments greater than about 10 mm of deflection. In some embodiments, the varistor can exhibit a change in capacitance that is less than about 4%, less than about 3%, or less than about 2% after being subjected to a board flex test according to AEC-Q200-005 with a deflection of about 3 mm for at least about 60 seconds, in some embodiments greater than about 5 mm of deflection, in some embodiments greater than about 7 mm of deflection, in some embodiments greater than 9 mm of deflection, and in some embodiments greater than about 10 mm of deflection.

As another example, the varistor can exhibit a change in breakdown voltage that is less than about 5% after being subjected to a board flex test according to AEC-Q200-005 with a deflection of about 3 mm for at least about 60 seconds, in some embodiments greater than about 5 mm of deflection, in some embodiments greater than about 7 mm of deflection, in some embodiments greater than 9 mm of deflection, and in some embodiments greater than about 10 mm of deflection. In some embodiments, the varistor can exhibit a change in capacitance that is less than about 4%, less than about 3%, less than about 2%, less than about 1%, less than about 0.50%, or less than about 0.20% after being subjected to a board flex test according to AEC-Q200-005 with a deflection of about 3 mm for at least about 60 seconds, in some embodiments greater than about 5 mm of deflection, in some embodiments greater than about 7 mm of deflection, in some embodiments greater than 9 mm of deflection, and in some embodiments greater than about 10 mm of deflection.

The varistor of the present disclosure can exhibit excellent durability when subjected to thermal stress. For example, the varistor can withstand greater than about 1000 temperature cycles when subjected to a temperature cycle test according to JESD22 Method JA-104 without electrical or optical failure, in some embodiments greater than about 2000 temperature cycles, in some embodiments greater than about 3000 temperature cycles.

Various performance characteristics of the varistor can be minimally affected by such thermal stresses. For instance, the varistor can exhibit a change in breakdown voltage that is less than about 5% after being subjected to a temperature cycle test according to JESD22 Method JA-104 for at least about 1000 cycles, in some embodiments at least about 2000 cycles, in some embodiments at least about 3000 cycles. In some embodiments, the varistor can exhibit a change in breakdown voltage that is less than about 2% after being subjected to a temperature cycle test according to JESD22 Method JA-104 for at least about 1000 cycles, in some embodiments at least about 2000 cycles, in some embodiments at least about 3000 cycles. In still other embodiments, the varistor can exhibit a change in breakdown voltage that is less than about 1%, less than about 0.90%, less than about 0.70%, less than about 0.50%, or less than about 0.30% after being subjected to a temperature cycle test according to JESD22 Method JA-104 for at least about 1000 cycles, in some embodiments at least about 2000 cycles, in some embodiments at least about 3000 cycles.

Reference will now be made in detail to the example embodiments of the multilayer varistor. Referring now to the drawings, FIG. 1 illustrates a cross-section view of one embodiment of a multilayer varistor 100 according to aspects of the present disclosure. The varistor 100 may include a monolithic body 102 having a first end 104 and a second end 106 that is spaced apart from the first end 104 in a longitudinal direction 108. The monolithic body 102 may include a first plurality of electrodes 110 extending from the first end 104 towards the second end 106 of the monolithic body 102. A second plurality of electrodes 112 may extend from the second end 106 towards the first end 104 of the monolithic body 102. The second plurality of electrodes 112 may be interleaved with the plurality of first electrodes 110. The monolithic body 102 may have a body length 118 in the longitudinal distance 108 between the first end 104 and the second end 106.

The varistor 100 may include a first external terminal 140 disposed along the first end 104 and connected with the first plurality of electrodes 110. The varistor 100 may include a second external terminal 142 disposed along the second end 106 and connected with the second plurality of electrodes 112. The first external terminal 140 may include a first compliant layer 144. The first compliant layer 144 may be formed over a first base layer 146. The first base layer 146 of the first external terminal 140 may be electrically connected with the first plurality of electrodes 110.

The varistor 100 may include a second external terminal 142 disposed along the second end 106 and connected with the second plurality of electrodes 112. The second external terminal 142 may include a second compliant layer 145. The second compliant layer 145 may be formed over a second base layer 147. The second base layer 147 of the second external terminal 142 may be electrically connected with the second plurality of electrodes 112.

The compliant layers 144, 145 may include a conductive polymeric composition, which may include a polymer and conductive particles, for example as described above. In some embodiments, the polymer may be or include an epoxy resin. The conductive particles may be or include a metal, such as silver, gold, copper, etc.

In some embodiments, the base layers 146, 147 may be formed by dipping the monolithic body 102 to form thick-film layers. In other embodiments, the base layers 146, 147 may be plated (e.g., using electrolytic or electroless plating).

One or more plated layers 148 may be formed over the compliant layers 146, 147. For example, the plated layers 148 of the first external terminal 140 may include a first plated layer formed over the compliant layer 146, 147 and a second plated layer formed over the first plated layer. The first plated layer and second plated layer (if present) may be formed of a variety of suitable metals. For example, the first plated layer may include nickel. The second plated layer may include tin.

Figure 2:
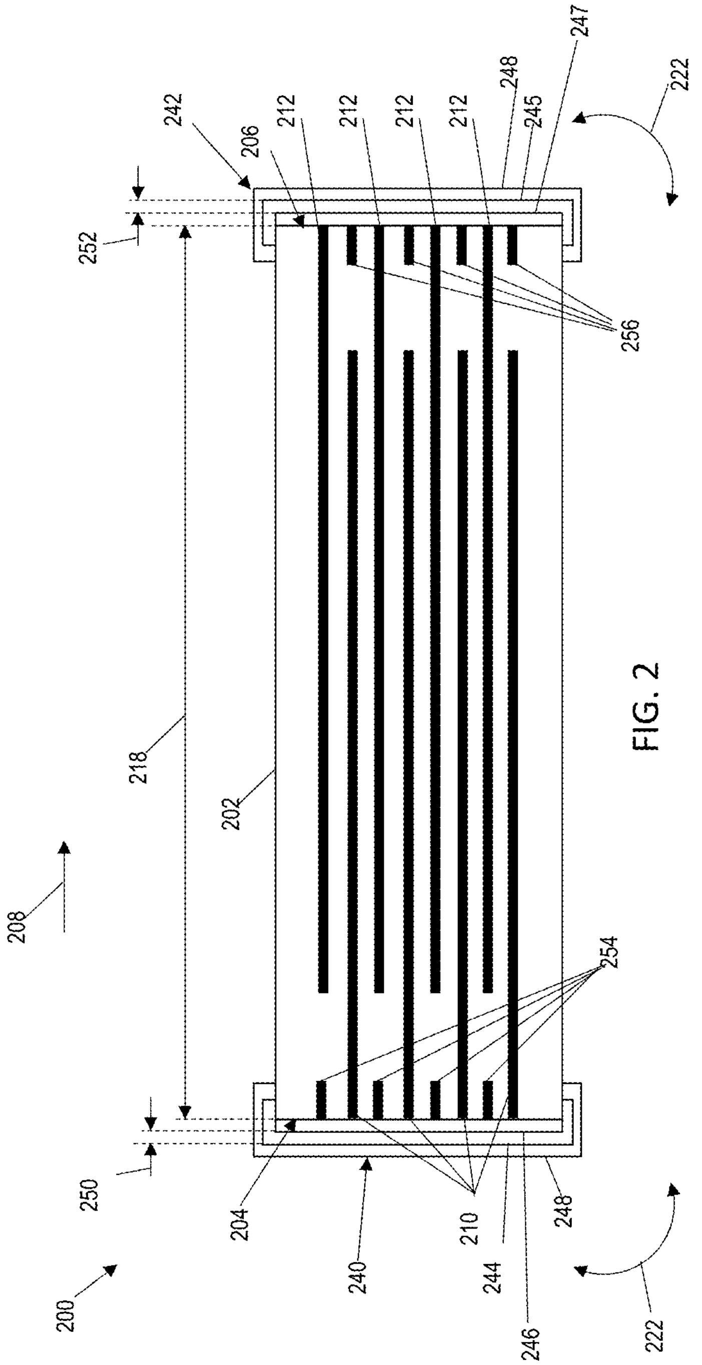
FIG. 2 illustrates a cross-section view of another embodiment of a varistor that includes anchor tabs according to aspects of the present disclosure.

FIG. 2 illustrates a cross-section view of another embodiment of a multilayer varistor 200 according to aspects of the present disclosure. The multilayer varistor 200 may be generally be configured as the multilayer varistor 100 of FIG. 1. The reference numbers of FIG. 2 may generally correspond with those of FIG. 1. The multilayer varistor 200 may additionally include a first plurality of anchor tabs 254 at the first end 204 of the monolithic body 202 and/or a second plurality of anchor tabs 256 at the second end 206 of the monolithic body 202.

The anchor tabs 254, 256 may act as nucleation points for plating (e.g., electroless plating) for the base layers 246, 247. For example, the anchor tabs 254, 256 can facilitate the formation of secure and reliable external plating. The anchor tabs, which typically provide no internal electrical connections, may be provided for enhanced external termination connectivity, better mechanical integrity and deposition of plating materials.

Figure 3:
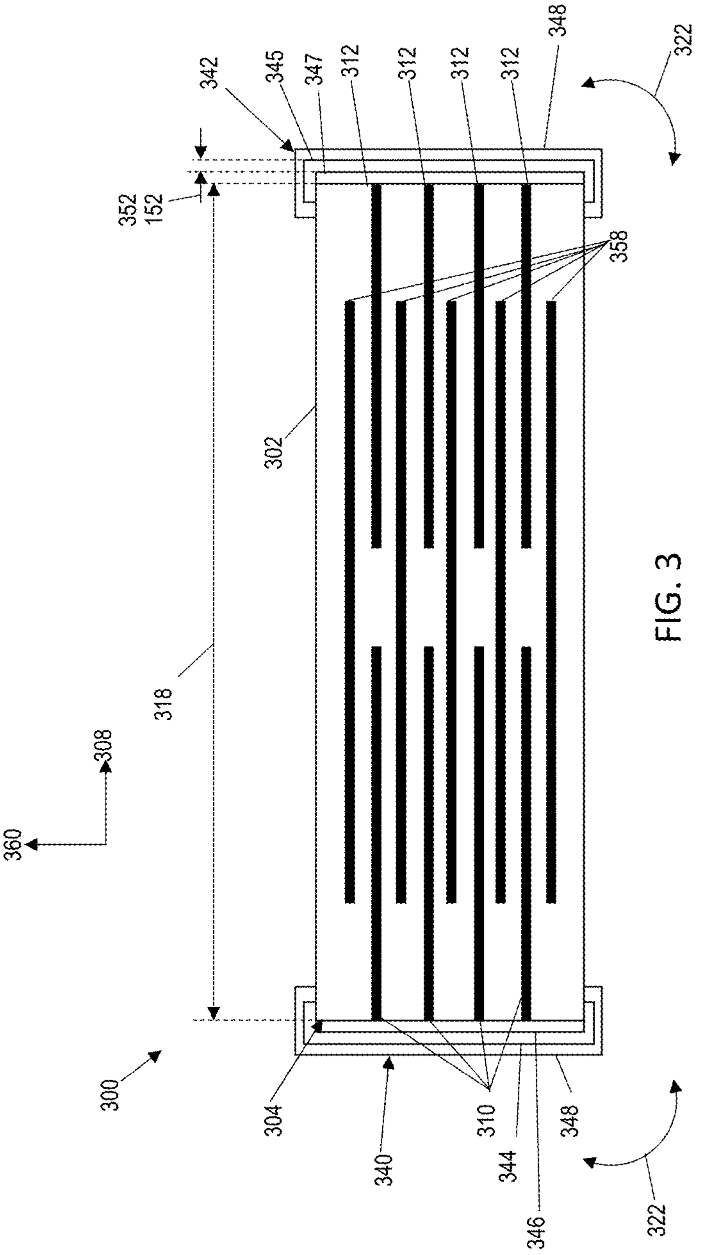
FIG. 3 illustrates a cross-section view of another embodiment of a varistor that includes floating electrodes according to aspects of the present disclosure.

FIG. 3 illustrates a cross-section view of another embodiment of a multilayer varistor 300 according to aspects of the present disclosure. The reference numbers of FIG. 3 may generally correspond with those of FIG. 1. The multilayer varistor 300 may additionally include one or more floating electrodes 358. For example, a first plurality of electrode 310 may be generally aligned in a Z-direction 360 with respective electrodes 312 of the second plurality of electrodes 312. The floating electrodes 358 may be interleaved with respective aligned pairs of electrodes 310, 312. However, it should be understood that, in some embodiments, the varistor may be free of floating electrodes.

Figure 4:
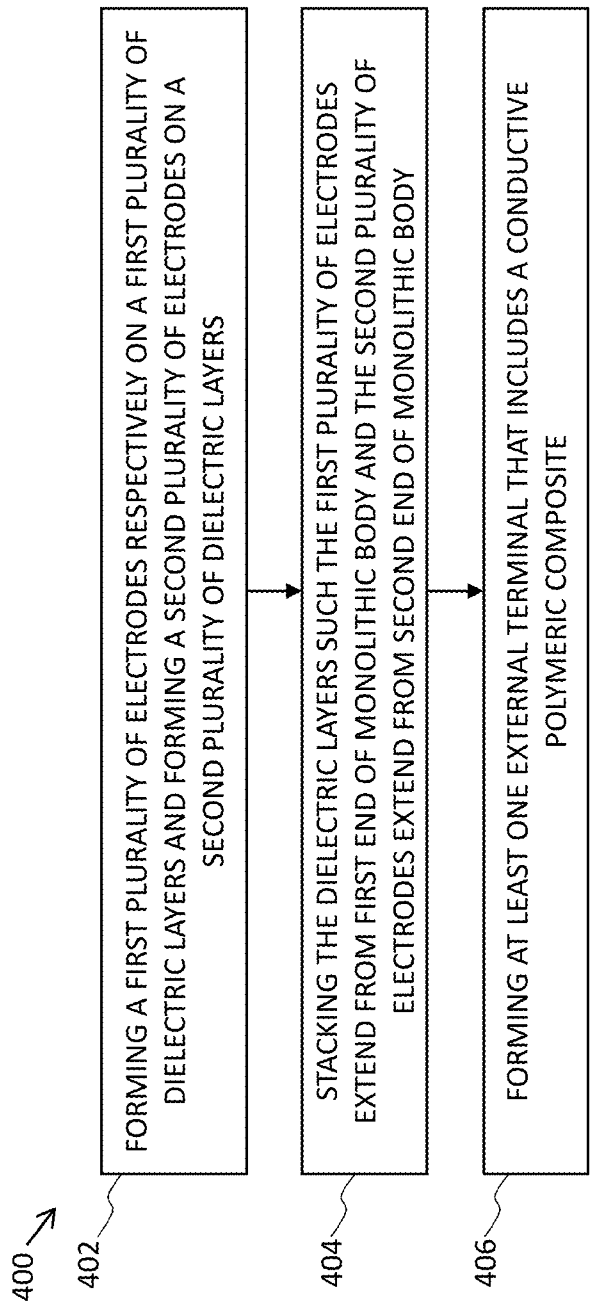
FIG. 4 is a flowchart of a method for forming a varistor according to aspects of the present disclosure.

FIG. 4 is a simplified flowchart of a method 400 of forming a varistor. The method can include, at (402), forming a first plurality of electrodes respectively on a first plurality of dielectric layers and forming a second plurality of electrodes on a second plurality of dielectric layers. The method 400 can include, at (404), stacking the first plurality of dielectric layers and second plurality of dielectric layers in a Z-direction that is perpendicular a longitudinal direction to form a monolithic body such that the first plurality of electrodes extend from a first end of the monolithic body and such that the second plurality of electrodes extend from a second end of the monolithic body. The method 400 can include, at (406), forming at least one external terminal that includes a conductive polymer composite, for example as described herein.

Applications

The varistor disclosed herein may find applications in a wide variety of devices. For example, the varistor may be used in radio frequency antenna/amplifier circuits. The varistor may also find application in various technologies including laser drivers, sensors, radars, radio frequency identification chips, near field communication, data lines, Bluetooth, optics, Ethernet, and in any suitable circuit.

The varistor disclosed herein may also find particular application in the automotive industry. For example, the varistor may be used in any of the above-described circuits in automotive applications. For such applications, passive electrical components may be required to meet stringent durability and/or performance requirements. For example, AEC-Q200 standards regulate certain automotive applications. A varistor according to aspects of the present disclosure may be capable of satisfying one or more AEC-Q200 tests, including for example, an AEC-Q200-002 pulse test.

Ultra-low capacitance varistors may find particular application in data processing and transmission technologies. For example, aspects of the present disclosure are directed to varistors exhibiting capacitance less than about 1 pF. Such varistors may contribute minimal signal distortion in high frequency data transmission circuits, for example.

The present disclosure may be better understood with reference to the following examples.

Test Methods

The following sections provide example methods for testing varistors to determine various varistor characteristics.

Transient Energy Capability

Figure 5:
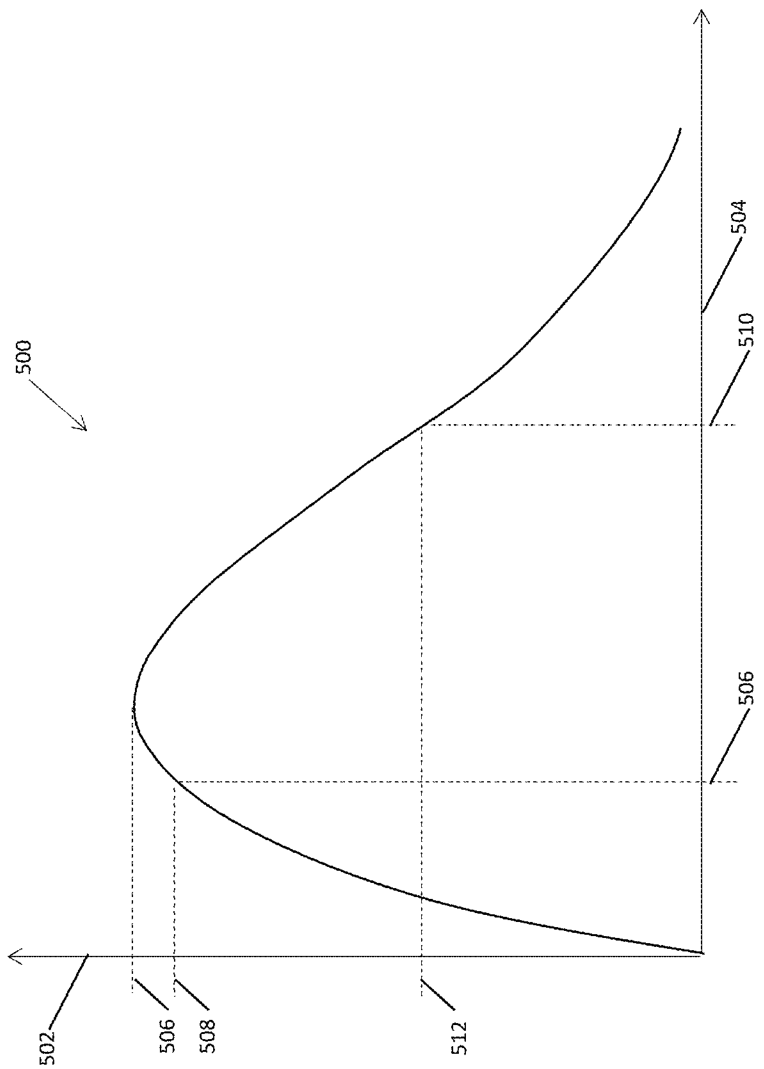
FIG. 5 illustrates a current wave for testing varistors according to ANSI Standard C62.1.

The transient energy capability of a varistor may be measured using a waveform generator and/or pulse generator, such as a Frothingham FEC CV300B. The varistor may be subjected to a 10×1000 μs current wave. The peak current value may be empirically selected to determine the maximum energy that the varistor is capable of dissipating without failing (e.g., by overheating). An exemplary current wave is illustrated in FIG. 5. The current (vertical axis 502) is plotted against time (horizontal axis 504). The current increases to the peak current value 506 and then decays. The "rise" time period (illustrated by vertical dotted line 506) is from the initiation of the current pulse (at t=0) to when the current reaches 90% of the peak current value 506 (illustrated by horizontal dotted line 508). The "decay time" (illustrated by vertical dotted line 510) is from the initiation of the current pulse (at t=0) to when the current returns to 50% of the peak current value 506 (illustrated by horizontal dotted line 512). For a 10×1000 μs pulse, the "rise" time is 10 μs and the decay time is 1000 μs.

Figure 6:
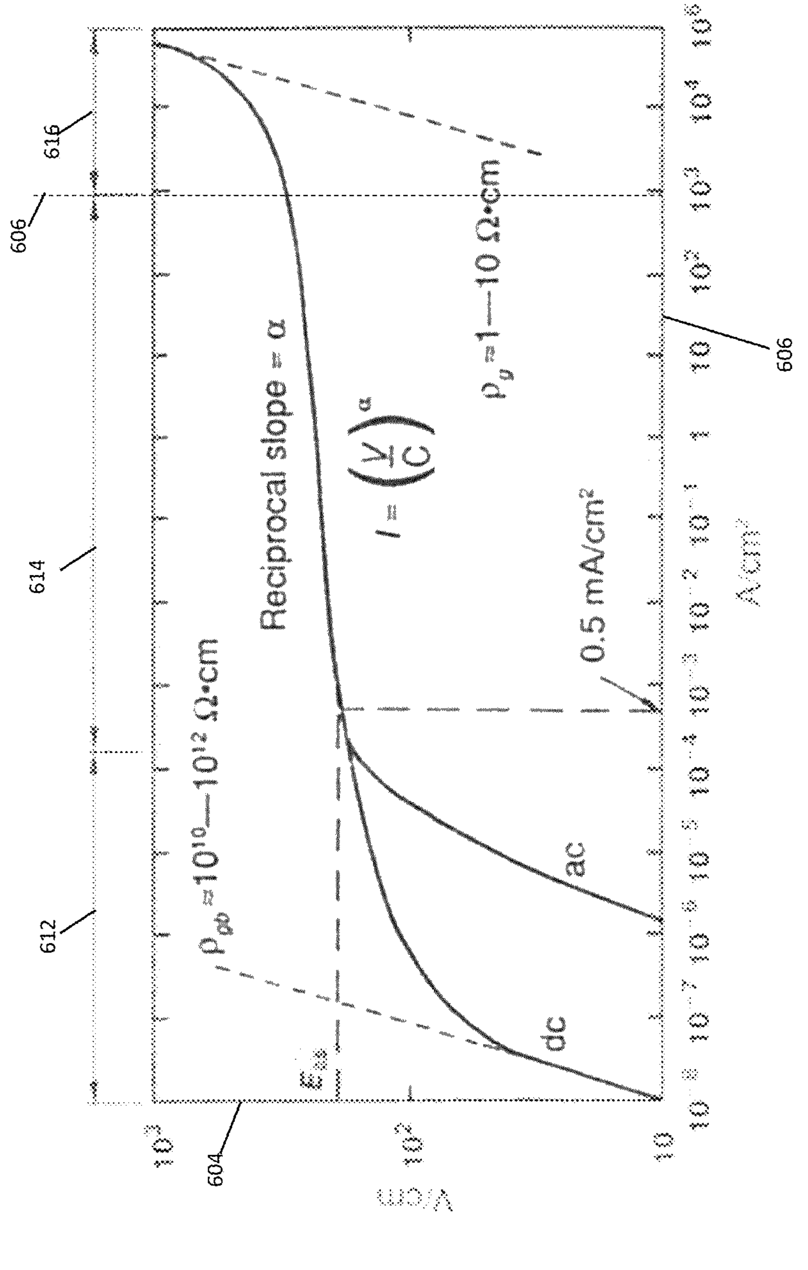
FIG. 6 illustrates a voltage response curve of a varistor according to aspects of the present disclosure.

During a pulse through the varistor, the voltage may be measured across the varistor. FIG. 6 illustrates an example plot of the voltage across the varistor (vertical axis 604) against the current through the varistor (horizontal axis 606).

The transient energy handling capability of the varistor 10 may be determined by calculating the amount of energy that has passed through the varistor 10. More specifically, the transient energy rating may be calculated by integrating the product of the measured current and the measured voltage with respect to time during the pulse:

$$E=\int IVdt$$

where E is the total energy dissipated by the varistor; I is the instantaneous current through the varistor; V is the instantaneous voltage across the varistor; and t represents time.

Alternatively, a square current pulse of a fixed duration of 2 ms can be applied to the varistor using a waveform generator and/or pulse generator, such as a Frothingham FEC CV300B. The current through the varistor and voltage across the varistor can be detected as described above. The total energy (Joules) absorbed by the varistor can be determined based on the measured current and voltage as described above. The current amplitude of the applied square current pulse can be determined based on an active volume of the varistor. The active volume of the varistor can be defined as an area of the active electrodes multiplied by a number of the active electrodes and multiplied by a thickness of the dielectric layers between the active electrodes.

With either of the above methods of determining transient energy capability of the varistor, the transient energy capability per unit active volume of the varistor can be determined by dividing the transient energy capability of the varistor by the active volume of the varistor. The varistor may have a transient energy capability per unit active volume of at least about 0.05 J/mm$^3$ when tested with a 10×1000 μs current wave, in some embodiments at least about 0.1 J/mm$^3$, in some embodiments at least about 0.2 J/mm$^3$, and in some embodiments at least about 1.0 J/mm$^3$.

Additionally, to determine the electrostatic discharge capabilities of the varistor, a series of repetitive electrostatic discharge strikes may be administered. For example, 5,000 or more 8,000 volt electrostatic discharge strikes may be applied to the varistor. The breakdown voltage of the varistor may be measured (as described below) at regular intervals during this series of strikes. The breakdown voltage of the varistor after the electrostatic discharge strikes can be measured and compared with an initial breakdown voltage before the strikes.

Breakdown Voltage

The breakdown voltage of the varistor may be measured using an instrument that can simultaneously source and measure current and/or voltage, such as a Keithley® 2400 series Source Measure Unit (SMU), for example, a Keithley® 2410-C SMU. By definition, breakdown voltage is the low current voltage of the varistor. Typically, breakdown voltage is measured at a current of 1 milliampere (mA).

Clamping Voltage

The clamping voltage is the transition voltage or the start of the conduction of the varistor. The varistor may be subjected to an 8/20 μs current wave, for example according to ANSI Standard C62.1. Typically, clamping voltage is measured at a current of 1 ampere (A), 5 A, or 10 A.

Peak Current

The peak current is the maximum current that the varistor can withstand measured with an 8/20 μs pulse. An exemplary current pulse is illustrated in FIG. 5. The current (vertical axis 502) is plotted against time (horizontal axis 504). The current may increase to the peak current value 506 and then decay. The "rise" time period (illustrated by vertical dotted line 506) may be from the initiation of the current pulse (at t=0) to when the current reaches 90% (illustrated by horizontal dotted line 508) of the peak current value 506. The "rise" time may be 8 μs. The "decay time" (illustrated by vertical dotted line 510) may be from the initiation of the current pulse (at t=0) to 50% (illustrated by horizontal dotted line 512) of the peak current value 506. The "decay time" may be 20 μs. The clamping voltage is measured as the maximum voltage across the varistor during the current wave.

Referring to FIG. 6, the current per unit area across the varistor (horizontal axis 606) is plotted against the voltage per unit length through the varistor (vertical axis 604). Across a prebreakdown voltage range 612, the varistor may generally exhibit a first response curve and a second response curve across a non-linear voltage range 614 that is less than a breakdown voltage range 606, an ideal varistor may generally exhibit voltages approximately according to the following relationship:

$$I = \left(\frac{V}{C}\right)^{\alpha}$$

where V represents voltage; I represents current; C is a constant; and a is defined as follows in the nonlinear region 614:

$$\alpha = \frac{d\ln I}{d\ln V}$$

In the prebreakdown voltage range 612, the voltage per unit length generally increases at a greater rate with respect to the current per unit area through the varistor than in the non-linear region 614. Across an upturn voltage range 616 that is greater than the breakdown voltage 606, the varistor may generally exhibit a third response curve, in which the voltage per unit length generally increases at a greater rate with respect to the current per unit area through the varistor than in the non-linear region 614.

Capacitance

The capacitance of the varistors may be measured using an instrument that provides a known voltage signal and measuring the resultant current that flows through the device under test, which current measurement may be used, e.g., to derive impedance, such as a Keithley® 3330 Precision LCZ meter with a DC bias of 0.0 volts, 1.1 volts, or 2.1 volts (0.5 volt root-mean-squared sinusoidal signal). The operating frequency is 1,000 Hz. The temperature is room temperature (~23° C.), and relative humidity is 25%.

Board Flex Test

Figure 7:
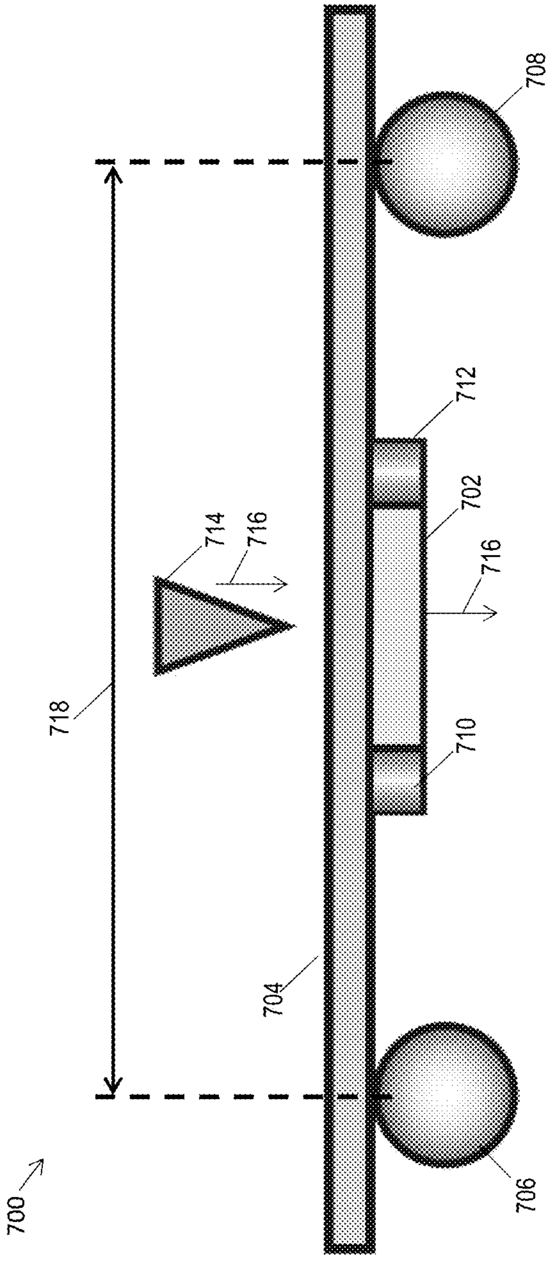
FIG. 7 illustrates a testing assembly for conducting a board flex test according to AEC-Q200-005.

A board flex test according to AEC-Q200-005 can be conducted to determine bending compliance of varistors according to aspects of the present disclosure. FIG. 7 illustrates a testing assembly 700 for conducting the board flex test according to AEC-Q200-005. A varistor 702 can be attached to a member 704 that is supported between a first support 706 and a second support 708. The varistor 702 can be soldered or otherwise affixed to the member 704 at a first terminal 710 and a second terminal 712 of the varistor 702. An implement 714 can be forced downward against the member 704 to cause the member 704 to bend downward as illustrated by arrows 716. The implement 714 can be moved downward at a constant rate (e.g., 1 mm/sec) until a maximum deflection of the member 704 at a center of the member 704 has been reached. The maximum deflection can range from 2 mm to 12 mm. The supports 706, 708 can be spaced apart by a spanning distance 718. The spanning distance 718 can be 90 mm.

Temperature Cycle Test

A temperature cycle test according to JESD22 Method JA-104 can be conducted to determine the resistance to high and low temperature extremes of varistors according to aspects of the present disclosure. A varistor can be soldered to a printed circuit board (PCB), and the varistor and PCB disposed in a temperature test chamber. For each cycle, the temperature within the temperature test chamber can be varied from a low temperature extreme of −55° C. to a high temperature extreme of 125° C., with the temperature held at the low temperature extreme for 15 minutes, the temperature held at the high temperature extreme for 15 minutes, and a transition time of less than 1 minute from one temperature extreme to the other. The cycle can be repeated for at least 1000 cycles, at least 2000 cycles, at least 3000 cycles, etc. Various parameters of the varistor, such as capacitance, clamping voltage, breakdown voltage, and leakage current, can be measured periodically during the temperature cycle test, e.g., at 250 cycles, 500 cycles, 1000 cycles, 2000 cycles, 3000 cycles, etc.

Examples

As is known in the art, the case size of electronic devices may be expressed as a four digit code (e.g., XXYY), in which the first two digits (XX) are the length of the device in millimeters (or in thousandths of an inch) and the last two digits (YY) are the width of the device in millimeters (or in thousandths of an inch). For instance, common metric case sizes may include 2012, 1608, and 0603.

A group of 5 varistors of case size 0603, a group of 5 varistors of case size 0805, a group of 5 varistors of case size 1206, and a group of 15 varistors of case size 1210 were fabricated and subjected to board flex tests according to AEC-Q200-005 as described above with reference to the board flex test and FIG. 7. The spanning distance 518 was 90 mm, and the implement 514 was moved downward at a constant rate of 1 mm/sec until a maximum deflection 12 mm was reached.

The following Tables 1-4 list tested capacitance values for each of the varistors before and after bending. "Cap. Dev. (%)" shows that the percent deviation between the capacitance values detected before and after the board flex test varied less than 1.5% for each of the case size 0603 varistors, less than 2.5% for each of the case size 0805 varistors, less than 1.1% for each of the case size 1206 varistors, and less than 4% for each of the case size 1210 varistors. Similarly, the tables show the breakdown voltages, VB, detected before and after the board flex test and a percent deviation therebetween. As shown below, the breakdown voltages before and after the board flex test varied less than 0.15% for each of the case size 0603 varistors, less than 0.35% for each of the case size 0805 varistors, less than 1% for each of the case size 1206 varistors, and less than 0.70% for each of the case size 1210 varistors. Lastly, leakage current at rated voltage ($I_L$) is listed for each varistor before and after the board flex tests. As indicated below, the leakage current values for each varistor before and after the board flex tests deviated less than 4.5% for each of the case size 0603 varistors, less than 2% for each of the case size 0805 varistors, less than 4.5% for each of the case size 1206 varistors, and less than 4.5% for each of the case size 1210 varistors.

TABLE 1

Capacitance, Breakdown Voltage, and Leakage Current for Case Size 0603 Varistors Before and After 10 mm Board Flex Test

| | Before Bending | | | After Bending | | | Deviation | | |
|---|---|---|---|---|---|---|---|---|---|
| | | | | | | | Cap. | $V_B$ | $I_L$ |
| | Cap. (pF) | $V_B$ (Volt) | $I_L$ (μA) | Cap. (pF) | $V_B$ (Volt) | $I_L$ (μA) | Dev. (%) | Dev. (%) | Dev. (%) |
| 1 | 101 | 41.76 | 0.177 | 99 | 41.79 | 0.172 | −1.39 | 0.07 | −2.83 |
| 2 | 106 | 40.94 | 0.225 | 104 | 40.99 | 0.229 | −1.14 | 0.12 | 1.74 |
| 3 | 103 | 41.32 | 0.214 | 102 | 41.36 | 0.213 | −1.26 | 0.10 | −0.48 |
| 4 | 101 | 40.97 | 0.140 | 100 | 41.02 | 0.134 | −1.18 | 0.12 | −4.34 |
| 5 | 103 | 41.99 | 0.146 | 101 | 42.03 | 0.143 | −1.07 | 0.10 | −1.81 |

TABLE 2

Capacitance, Breakdown Voltage, and Leakage Current for Case Size 0805 Varistors Before and After 10 mm Board Flex Test

| | Before Bending | | | After Bending | | | Deviation | | |
|---|---|---|---|---|---|---|---|---|---|
| | | | | | | | Cap. | $V_B$ | $I_L$ |
| | Cap. (pF) | $V_B$ (Volt) | $I_L$ (μA) | Cap. (pF) | $V_B$ (Volt) | $I_L$ (μA) | Dev. (%) | Dev. (%) | Dev. (%) |
| 1 | 408 | 26.28 | 0.147 | 399 | 26.33 | 0.145 | −2.21 | 0.19 | −1.51 |
| 2 | 410 | 26.19 | 0.149 | 400 | 26.23 | 0.149 | −2.44 | 0.15 | 0.22 |
| 3 | 413 | 25.83 | 0.162 | 403 | 25.91 | 0.161 | −2.47 | 0.31 | −0.63 |
| 4 | 412 | 26.28 | 0.155 | 402 | 26.33 | 0.153 | −2.48 | 0.19 | −1.18 |
| 5 | 410 | 26.03 | 0.156 | 400 | 26.09 | 0.155 | −2.44 | 0.23 | −0.90 |

TABLE 3

Capacitance, Breakdown Voltage, and Leakage Current for Case Size 1206 Varistors Before and After 11 mm Board Flex Test

| | Before Bending | | | After Bending | | | Deviation | | |
|---|---|---|---|---|---|---|---|---|---|
| | | | | | | | Cap. | $V_B$ | $I_L$ |
| | Cap. (pF) | $V_B$ (Volt) | $I_L$ (μA) | Cap. (pF) | $V_B$ (Volt) | $I_L$ (μA) | Dev. (%) | Dev. (%) | Dev. (%) |
| 1 | 1066 | 18.78 | 0.273 | 1055 | 18.94 | 0.261 | −1.03 | 0.85 | −4.22 |
| 2 | 1072 | 18.80 | 0.364 | 1061 | 18.82 | 0.361 | −1.03 | 0.11 | −0.78 |
| 3 | 1097 | 18.28 | 0.360 | 1088 | 18.31 | 0.354 | −0.82 | 0.16 | −1.69 |
| 4 | 1077 | 19.07 | 0.271 | 1069 | 19.10 | 0.260 | −0.74 | 0.16 | −4.13 |
| 5 | 1145 | 17.73 | 0.478 | 1151 | 17.90 | 0.463 | 0.52 | 0.96 | −3.12 |

TABLE 4

Capacitance, Breakdown Voltage, and Leakage Current for Case Size 1210 Varistors Before and After 10 mm Board Flex Test

| | Before Bending | | | After Bending | | | Deviation | | |
|---|---|---|---|---|---|---|---|---|---|
| | | | | | | | Cap. | $V_B$ | $I_L$ |
| | Cap. (pF) | $V_B$ (Volt) | $I_L$ (μA) | Cap. (pF) | $V_B$ (Volt) | $I_L$ (μA) | Dev. (%) | Dev. (%) | Dev. (%) |
| 1 | 2756 | 25.08 | 0.782 | 2658 | 25.25 | 0.764 | −3.56 | 0.68 | −2.30 |
| 2 | 2826 | 25.92 | 0.731 | 2727 | 26.02 | 0.720 | −3.50 | 0.39 | −1.50 |
| 3 | 2814 | 26.34 | 0.685 | 2712 | 26.42 | 0.682 | −3.62 | 0.30 | −0.44 |
| 4 | 2778 | 25.78 | 0.705 | 2683 | 25.89 | 0.712 | −3.42 | 0.43 | 0.99 |
| 5 | 2752 | 26.63 | 0.691 | 2657 | 26.81 | 0.692 | −3.45 | 0.68 | 0.14 |
| 6 | 2780 | 26.3 | 0.74 | 2751 | 26.54 | 0.710 | −1.04 | 0.04 | −4.05 |
| 7 | 2831 | 25.48 | 0.813 | 2796 | 25.52 | 0.790 | −1.24 | 0.16 | −2.83 |
| 8 | 2646 | 26.73 | 0.654 | 2614 | 26.75 | 0.630 | −1.21 | 0.07 | −3.67 |
| 9 | 2833 | 26.12 | 0.756 | 2799 | 26.22 | 0.735 | −1.20 | 0.38 | −2.78 |
| 10 | 2719 | 26.73 | 0.693 | 2684 | 26.70 | 0.681 | −1.29 | −0.11 | −1.73 |
| 11 | 2727 | 25.78 | 0.723 | 2714 | 25.82 | 0.701 | −0.48 | 0.16 | −3.04 |
| 12 | 2717 | 26.36 | 0.736 | 2702 | 26.43 | 0.715 | −0.55 | 0.27 | −2.85 |
| 13 | 2723 | 26.2 | 0.717 | 2698 | 26.24 | 0.724 | −0.92 | 0.15 | 0.98 |
| 14 | 2830 | 25.99 | 0.735 | 2810 | 26.04 | 0.716 | −0.71 | 0.19 | −2.59 |
| 15 | 2956 | 24.99 | 0.883 | 2939 | 25.03 | 0.862 | −0.58 | 0.16 | −2.38 |

The small changes in performance characteristics caused by the board flex test, as shown in the tables above, indicate that the varistors were not significantly affected by the bending tests and can withstand significant bending during use.

A group of 20 varistors of case size 0603, a group of 20 varistors of case size 0805, a group of 20 varistors of case size 1206, and a group of 20 varistors of case size 1210 were fabricated and subjected to temperature cycle tests according to JESD22 Method JA-104 as described above with reference to the temperature cycle test. The low temperature extreme was −55° C. and the high temperature extreme was 125° C. For each cycle, the temperature within the temperature test chamber, in which was positioned the respective varistor soldered to a PCB, was transitioned between the low temperature extreme and the high temperature extreme, with the temperature held at each of the low temperature extreme and the high temperature extreme for 15 minutes and a transition time between the low and high temperature extremes of less than 1 minute.

None of the tested varistors experienced electrical or optical/observable failure during the temperature cycle test up to 1000 temperature cycles, up to 2000 temperature cycles, or up to 3000 temperature cycles. In comparison, control groups of varistors, which did not have at least one external terminal as described herein (e.g., did not have at least one external terminal with a conductive polymeric composition), were tested according to the temperature cycle test described herein, and the control groups did experience failure during the temperature cycle test. For example, a control group of varistors of case size 0603, none of which had at least one external terminal formed as described herein, had a 5% failure rate at 3000 temperature cycles. A control group of varistors of case size 0805, none of which had at least one external terminal formed as described herein, had a 15% failure rate at 3000 temperature cycles. A control group of varistors of case size 1206, none of which had at least one external terminal formed as described herein, had a 5% failure rate at 3000 temperature cycles. A control group of varistors of case size 1210, none of which had at least one external terminal formed as described herein, had a 10% failure rate at 3000 temperature cycles.

The following Tables 5-8 list breakdown voltages, VB, detected before the temperature cycle test (initial VB), after 1000 cycles, after 2000 cycles, after 3000 cycles, and a percent deviation between the initial breakdown voltage and each of the after cycle measurements. As shown below, the breakdown voltages before and after 1000 cycles varied less than 0.50% for each of the case size 0603 varistors, less than 0.70% for each of the case size 0805 varistors, less than 1.00% for each of the case size 1206 varistors, and less than 0.50% for each of the case size 1210 varistors. The breakdown voltages before and after 2000 cycles varied less than 0.50% for each of the case size 0603 varistors, less than 0.80% for each of the case size 0805 varistors, less than 2.60% for each of the case size 1206 varistors, and less than 0.90% for each of the case size 1210 varistors. Further, the breakdown voltages before and after 3000 cycles varied less than 0.90% for each of the case size 0603 varistors, less than 1.50% for each of the case size 0805 varistors, less than 0.40% for each of the case size 1206 varistors, and less than 0.50% for each of the case size 1210 varistors.

TABLE 5

Breakdown Voltage for Case Size 0603 Varistors Before and After 1000, 2000, and 3000 Temperature Cycles

| | | After 1000 Cycles | | After 2000 Cycles | | After 3000 Cycles | |
|---|---|---|---|---|---|---|---|
| | Initial $V_B$ (Volt) | $V_B$ (Volt) | Change in $V_B$ (%) | $V_B$ (Volt) | Change in $V_B$ (%) | $V_B$ (Volt) | Change in $V_B$ (%) |
| 1 | 41.9 | 41.8 | −0.19 | 41.8 | −0.25 | 41.6 | −0.73 |
| 2 | 41.5 | 41.4 | −0.09 | 41.4 | −0.16 | 41.2 | −0.65 |
| 3 | 41.3 | 41.2 | −0.20 | 41.1 | −0.28 | 40.9 | −0.81 |
| 4 | 41.4 | 41.4 | −0.05 | 41.4 | −0.15 | 41.1 | −0.68 |
| 5 | 41.8 | 41.7 | −0.22 | 41.7 | −0.21 | 41.5 | −0.71 |
| 6 | 41.8 | 41.9 | 0.27 | 41.9 | 0.22 | 41.7 | −0.36 |
| 7 | 41.2 | 41.2 | −0.03 | 41.2 | −0.11 | 40.9 | −0.79 |
| 8 | 41.4 | 41.6 | 0.47 | 41.6 | 0.41 | 41.3 | −0.30 |
| 9 | 41.0 | 40.9 | −0.27 | 40.8 | −0.33 | 40.7 | −0.69 |
| 10 | 41.3 | 41.3 | −0.11 | 41.2 | −0.16 | 41.0 | −0.69 |
| 11 | 42.1 | 42.3 | 0.40 | 42.3 | 0.34 | 42.0 | −0.22 |
| 12 | 41.1 | 41.1 | 0.07 | 41.1 | 0.01 | 40.9 | −0.51 |
| 13 | 41.7 | 41.7 | −0.17 | 41.6 | −0.25 | 41.5 | −0.69 |
| 14 | 41.0 | 40.9 | −0.12 | 40.9 | −0.14 | 40.7 | −0.75 |
| 15 | 40.4 | 40.3 | −0.33 | 40.3 | −0.37 | 40.1 | −0.77 |
| 16 | 41.6 | 41.8 | 0.46 | 41.7 | 0.39 | 41.5 | −0.16 |
| 17 | 40.9 | 41.0 | 0.33 | 41.0 | 0.23 | 40.7 | −0.46 |
| 18 | 42.2 | 42.1 | −0.24 | 42.1 | −0.31 | 41.9 | −0.70 |
| 19 | 41.5 | 41.5 | −0.13 | 41.5 | −0.17 | 41.2 | −0.77 |
| 20 | 41.7 | 41.8 | 0.16 | 41.7 | 0.11 | 41.5 | −0.38 |

TABLE 6

Breakdown Voltage for Case Size 0805 Varistors Before and After 1000, 2000, and 3000 Temperature Cycles

| | | After 1000 Cycles | | After 2000 Cycles | | After 3000 Cycles | |
|---|---|---|---|---|---|---|---|
| | Initial $V_B$ (Volt) | $V_B$ (Volt) | Change in $V_B$ (%) | $V_B$ (Volt) | Change in $V_B$ (%) | $V_B$ (Volt) | Change in $V_B$ (%) |
| 1 | 26.3 | 26.3 | 0.35 | 26.3 | 0.31 | 26.2 | −0.21 |
| 2 | 27.6 | 27.6 | −0.16 | 27.6 | −0.25 | 27.4 | −0.75 |
| 3 | 27.2 | 27.1 | −0.03 | 27.1 | −0.06 | 26.9 | −1.01 |
| 4 | 27.2 | 27.0 | −0.67 | 27.0 | −0.72 | 26.9 | −1.33 |
| 5 | 26.7 | 26.6 | −0.61 | 26.5 | −0.64 | 26.4 | −1.33 |
| 6 | 26.5 | 26.4 | −0.17 | 26.4 | −0.21 | 26.2 | −0.91 |
| 7 | 27.0 | 26.9 | −0.35 | 26.9 | −0.40 | 26.7 | −1.06 |
| 8 | 26.4 | 26.4 | −0.19 | 26.4 | −0.24 | 26.2 | −0.86 |
| 9 | 27.3 | 27.3 | 0.00 | 27.3 | −0.01 | 27.0 | −0.93 |
| 10 | 26.8 | 26.8 | 0.01 | 26.8 | −0.07 | 26.6 | −0.94 |

TABLE 6-continued

Breakdown Voltage for Case Size 0805 Varistors Before and After 1000, 2000, and 3000 Temperature Cycles

| | | After 1000 Cycles | | After 2000 Cycles | | After 3000 Cycles | |
|---|---|---|---|---|---|---|---|
| | Initial $V_B$ (Volt) | $V_B$ (Volt) | Change in $V_B$ (%) | $V_B$ (Volt) | Change in $V_B$ (%) | $V_B$ (Volt) | Change in $V_B$ (%) |
| 11 | 27.1 | 27.1 | −0.16 | 27.1 | −0.20 | 27.0 | −0.27 |
| 12 | 26.4 | 26.4 | 0.02 | 26.4 | −0.06 | 26.4 | −0.15 |
| 13 | 27.1 | 26.9 | −0.38 | 26.9 | −0.42 | 27.0 | −0.22 |
| 14 | 26.6 | 26.5 | −0.22 | 26.5 | −0.30 | 26.5 | −0.24 |
| 15 | 26.2 | 26.1 | −0.34 | 26.1 | −0.38 | 26.2 | −0.20 |
| 16 | 26.7 | 26.8 | 0.28 | 26.8 | 0.23 | 26.6 | −0.19 |
| 17 | 26.5 | 26.6 | 0.27 | 26.6 | 0.23 | 26.5 | −0.20 |
| 18 | 26.7 | 26.7 | −0.05 | 26.6 | −0.09 | 26.7 | −0.07 |
| 19 | 27.0 | 27.0 | −0.08 | 27.0 | −0.18 | 27.0 | −0.21 |
| 20 | 27.6 | 27.5 | −0.37 | 27.4 | −0.40 | 27.5 | −0.20 |

TABLE 7

Breakdown Voltage for Case Size 1206 Varistors Before and After 1000, 2000, and 3000 Temperature Cycles

| | | After 1000 Cycles | | After 2000 Cycles | | After 3000 Cycles | |
|---|---|---|---|---|---|---|---|
| | Initial $V_B$ (Volt) | $V_B$ (Volt) | Change in $V_B$ (%) | $V_B$ (Volt) | Change in $V_B$ (%) | $V_B$ (Volt) | Change in $V_B$ (%) |
| 1 | 18.7 | 18.8 | 0.58 | 18.7 | 0.03 | 18.7 | −0.02 |
| 2 | 18.1 | 18.2 | 0.22 | 18.1 | −0.30 | 18.1 | 0.10 |
| 3 | 18.8 | 18.8 | 0.28 | 18.8 | −0.08 | 18.8 | −0.01 |
| 4 | 18.1 | 18.2 | 0.69 | 18.2 | 0.39 | 18.2 | 0.30 |
| 5 | 19.3 | 19.3 | 0.21 | 19.2 | −0.33 | 19.3 | 0.03 |
| 6 | 18.4 | 18.5 | 0.27 | 18.4 | −0.06 | 18.4 | 0.10 |
| 7 | 18.7 | 18.6 | −0.17 | 18.6 | −0.61 | 18.7 | −0.07 |
| 8 | 18.6 | 18.7 | 0.62 | 19.1 | 2.53 | 18.6 | −0.10 |
| 9 | 18.9 | 19.1 | 0.62 | 19.0 | 0.27 | 19.0 | 0.34 |
| 10 | 19.3 | 19.3 | −0.19 | 19.2 | −0.56 | 19.3 | −0.06 |
| 11 | 19.4 | 19.4 | 0.17 | 19.3 | −0.23 | 19.4 | −0.11 |
| 12 | 18.4 | 18.6 | 0.93 | 18.5 | 0.36 | 18.4 | 0.12 |
| 13 | 18.4 | 18.5 | 0.42 | 18.4 | 0.01 | 18.4 | −0.01 |
| 14 | 18.4 | 18.5 | 0.45 | 18.5 | 0.07 | 18.4 | 0.00 |
| 15 | 18.4 | 18.5 | 0.53 | 18.5 | 0.12 | 18.4 | −0.08 |
| 16 | 17.8 | 17.8 | −0.15 | 17.8 | −0.54 | 17.9 | 0.06 |
| 17 | 18.3 | 18.4 | 0.17 | 18.3 | −0.24 | 18.3 | −0.07 |
| 18 | 18.4 | 18.4 | −0.17 | 18.3 | −0.61 | 18.4 | −0.04 |
| 19 | 18.4 | 18.4 | 0.32 | 18.4 | 0.02 | 18.4 | 0.23 |
| 20 | 18.3 | 18.4 | 0.33 | 18.3 | −0.17 | 18.3 | −0.06 |

TABLE 8

Breakdown Voltage for Case Size 1210 Varistors Before and After 1000, 2000, and 3000 Temperature Cycles

| | | After 1000 Cycles | | After 2000 Cycles | | After 3000 Cycles | |
|---|---|---|---|---|---|---|---|
| | Initial $V_B$ (Volt) | $V_B$ (Volt) | Change in $V_B$ (%) | $V_B$ (Volt) | Change in $V_B$ (%) | $V_B$ (Volt) | Change in $V_B$ (%) |
| 1 | 27.4 | 27.5 | 0.25 | 27.5 | 0.32 | 27.5 | 0.24 |
| 2 | 26.7 | 26.8 | 0.22 | 26.8 | 0.23 | 26.8 | 0.28 |
| 3 | 27.0 | 26.9 | −0.27 | 27.0 | 0.19 | 27.0 | 0.25 |
| 4 | 27.7 | 27.5 | −0.46 | 27.6 | −0.10 | 27.7 | 0.15 |
| 5 | 27.4 | 27.4 | −0.01 | 27.5 | 0.45 | 27.5 | 0.36 |
| 6 | 27.6 | 27.6 | −0.13 | 27.7 | 0.22 | 27.7 | 0.31 |
| 7 | 26.3 | 26.4 | 0.32 | 26.5 | 0.80 | 26.5 | 0.45 |
| 8 | 27.3 | 27.2 | −0.21 | 27.3 | 0.17 | 27.3 | 0.16 |
| 9 | 27.4 | 27.3 | −0.33 | 27.4 | 0.17 | 27.4 | 0.09 |
| 10 | 26.7 | 26.6 | −0.20 | 26.8 | 0.32 | 26.8 | 0.26 |
| 11 | 27.6 | 27.5 | −0.25 | 27.6 | 0.18 | 27.5 | −0.10 |
| 12 | 27.3 | 27.4 | 0.24 | 27.5 | 0.63 | 27.5 | 0.49 |

TABLE 8-continued

Breakdown Voltage for Case Size 1210 Varistors Before and After 1000, 2000, and 3000 Temperature Cycles

| | | After 1000 Cycles | | After 2000 Cycles | | After 3000 Cycles | |
|---|---|---|---|---|---|---|---|
| | Initial $V_B$ (Volt) | $V_B$ (Volt) | Change in $V_B$ (%) | $V_B$ (Volt) | Change in $V_B$ (%) | $V_B$ (Volt) | Change in $V_B$ (%) |
| 13 | 27.4 | 27.4 | 0.06 | 27.5 | 0.42 | 27.4 | 0.30 |
| 14 | 27.3 | 27.2 | −0.19 | 27.4 | 0.30 | 27.3 | 0.20 |
| 15 | 26.9 | 26.8 | −0.18 | 27.0 | 0.37 | 27.0 | 0.36 |
| 16 | 27.8 | 27.8 | 0.12 | 27.9 | 0.45 | 27.8 | 0.13 |
| 17 | 26.7 | 26.8 | 0.09 | 26.9 | 0.54 | 26.8 | 0.34 |
| 18 | 27.0 | 27.0 | −0.18 | 27.1 | 0.27 | 27.1 | 0.20 |
| 19 | 26.6 | 26.5 | −0.20 | 26.6 | 0.24 | 26.6 | 0.28 |
| 20 | 27.4 | 27.4 | −0.06 | 27.5 | 0.31 | 27.5 | 0.26 |

The small changes in breakdown voltage caused by the temperature cycle test, as shown in the tables above, indicate that the varistors were not significantly affected by the temperature cycle tests and can withstand significant temperature cycling during use.

Figure 8:
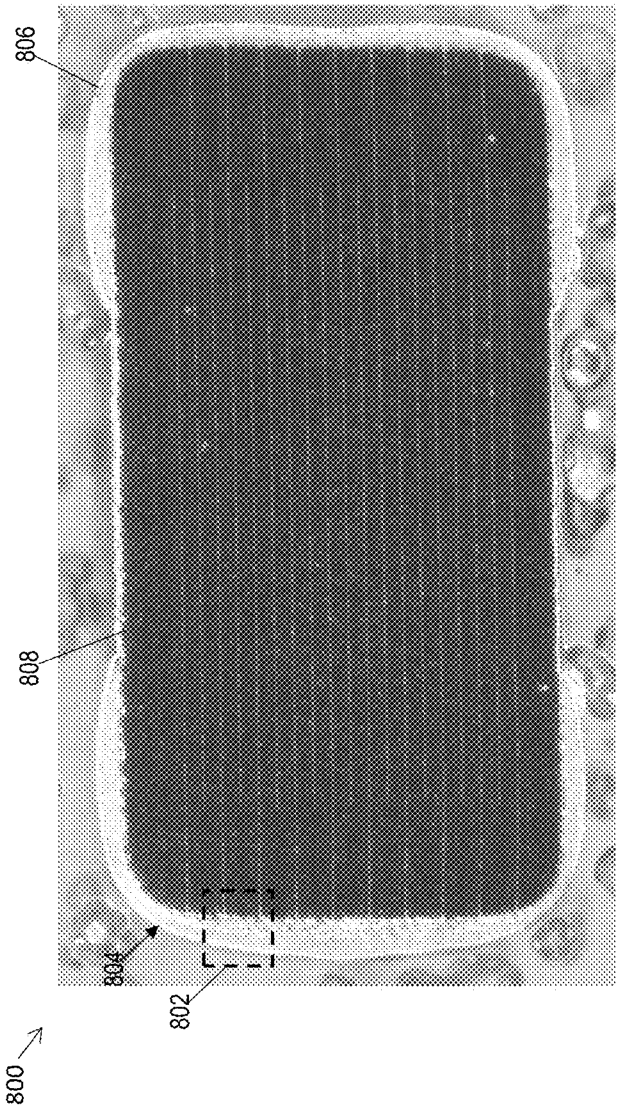
FIG. 8 depicts a cross sectional view of an example varistors according to the present disclosure.
Figure 9:
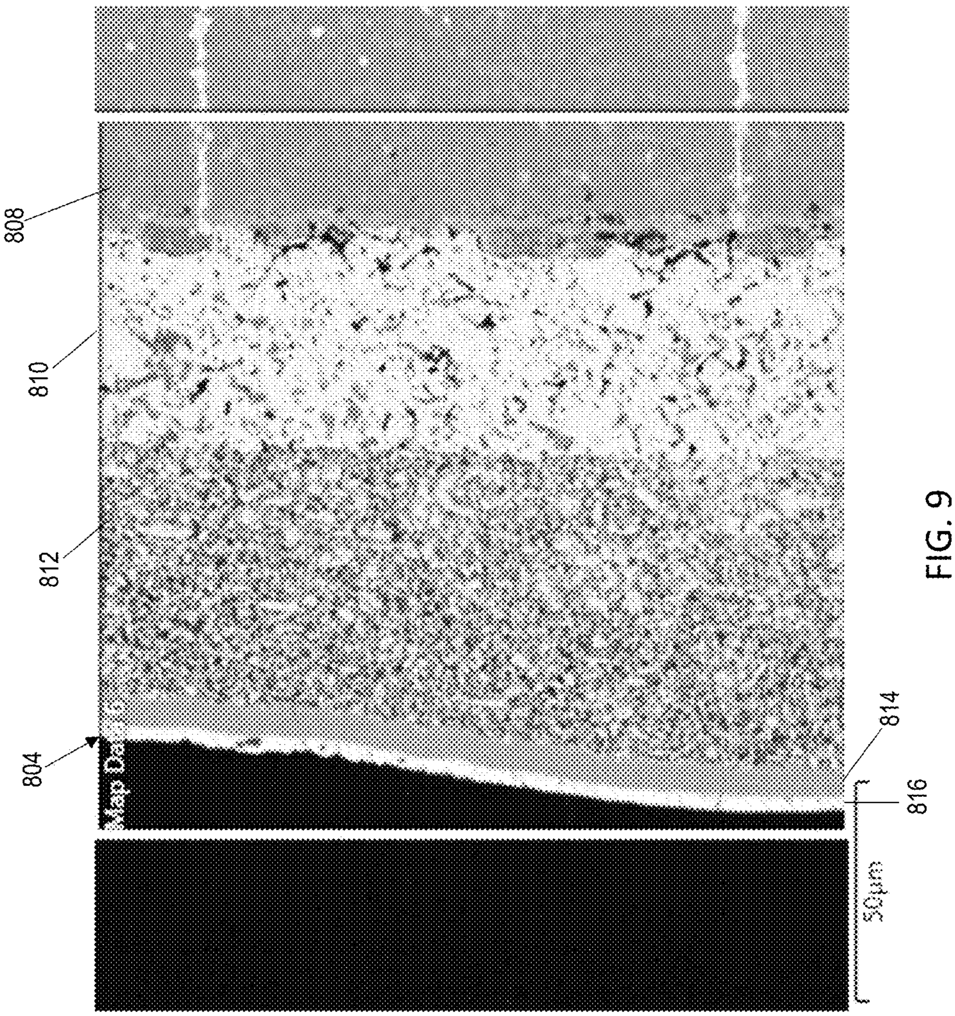
FIG. 9 is an enlarged view of an area of the varistor of FIG. 8.

FIG. 8 depicts a cross sectional view 800 of one of the example varistors. FIG. 9 is an enlarged view of area 802 of FIG. 8. The varistor 800 includes a first external terminal 804 and a second external terminal 806 at respective ends of a monolithic body 808. Referring to FIG. 9, the first external terminal 804 includes a silver base layer 810 formed over the ceramic body 808 of the varistor and in direct contact with the ceramic body 808. The silver base layer 810 has a thickness of about 60 microns. The first external terminal 804 includes a compliant layer 812 of silver epoxy formed over the silver base layer 810 and in direct contact with the silver base layer 810. The compliant layer 812 has a thickness ranging from about 20 microns (at a thinnest point) to about 90 microns (at a thickest point). A plated layer of nickel 814 is formed over the epoxy silver layer 812. A plated layer of tin 816 is formed over the plated layer of nickel 814.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only and is not intended to limit the invention so further described in such appended claims.

What is claimed is:

1. A varistor comprising:
a monolithic body comprising a plurality of dielectric layers stacked in a Z-direction that is perpendicular to a longitudinal direction, the monolithic body having a first end and a second end that is spaced apart from the first end in the longitudinal direction;
a first external terminal disposed along the first end;
a second external terminal disposed along the second end;
a first plurality of electrodes connected with the first external terminal and extending from the first end towards the second end of the monolithic body; and
a second plurality of electrodes connected with the second external terminal and extending from the second end towards the first end of the monolithic body;
wherein at least one of the first external terminal or the second external terminal comprises a conductive polymeric composition; and wherein the varistor exhibits a capacitance of less than 50 pF with a DC bias of 0.0 volts and a 0.5 volt root-mean-squared sinusoidal signal at an operating frequency of 1,000 Hz, a temperature of about 23° C., and a relative humidity of 25%.

2. The varistor of claim 1, wherein the varistor exhibits resistance according to a resistance curve that is non-linear.

3. The varistor of claim 1, wherein a breakdown voltage of the varistor after 5,000 or more electrostatic discharge strikes of about 8,000 volts is greater than about 0.9 times an initial breakdown voltage of the varistor.

4. The varistor of claim 1, wherein the varistor has a transient energy capability per unit active volume of at least about 0.05 J/mm3 when tested with a 10×1000 μs current wave.

5. The varistor of claim 1, wherein the plurality of dielectric layers comprises zinc oxide.

6. The varistor of claim 1, wherein the plurality of dielectric layers comprises oxides of at least one of cobalt, bismuth, praseodymium, or manganese.

7. The varistor of claim 1, wherein the plurality of dielectric layers comprises an average grain size ranging from about 1 micron to about 100 microns.

8. The varistor of claim 1, wherein the conductive polymeric composition comprises an epoxy resin.

9. The varistor of claim 1, wherein the conductive polymeric composition comprises conductive particles.

10. The varistor of claim 9, wherein the conductive particles comprise silver.

11. The varistor of claim 1, wherein the conductive polymeric composition has a Young's modulus that is less than about 3 GPa as tested in accordance with ASTM D638-14 at about 23° C. and 20% relative humidity.

12. The varistor of claim 1, wherein the conductive polymeric composition exhibits a volume resistivity that is less than about 0.01 ohm-cm as tested in accordance with ASTM B193-16 at about 23° C. and 20% relative humidity.

13. The varistor of claim 1, wherein the varistor can withstand greater than about 5 mm of deflection for at least about 60 seconds when subjected to a board flex test according to AEC-Q200-005 without mechanical failure.

14. The varistor of claim 1, wherein the varistor exhibits a change in leakage current that is less than about 5% after being subjected to a board flex test according to AEC-Q200-005 with a deflection of about 5 mm for at least about 60 seconds.

15. The varistor of claim 1, wherein the varistor exhibits a change in capacitance that is less than about 5% after being subjected to a board flex test according to AEC-Q200-005 with a deflection of about 5 mm for at least about 60 seconds.

16. The varistor of claim 1, wherein the varistor exhibits a change in breakdown voltage that is less than about 5% after being subjected to a board flex test according to AEC-Q200-005 with a deflection of about 5 mm for at least about 60 seconds.

17. The varistor of claim 1, wherein the varistor exhibits a change in breakdown voltage that is less than about 5% after being subjected to a temperature cycle test according to JESD22 Method JA-104 for at least about 3000 cycles.

18. A varistor comprising:
a monolithic body comprising a plurality of dielectric layers stacked in a Z-direction that is perpendicular to a longitudinal direction, the monolithic body having a first end and a second end that is spaced apart from the first end in the longitudinal direction;
a first external terminal disposed along the first end;

a second external terminal disposed along the second end;

a first plurality of electrodes connected with the first external terminal and extending from the first end towards the second end of the monolithic body; and a second plurality of electrodes connected with the second external terminal and extending from the second end towards the first end of the monolithic body;

wherein at least one of the first external terminal or the second external terminal comprises a conductive polymeric composition; and wherein the varistor exhibits a capacitance of greater than 50 pF with a DC bias of 0.0 volts and a 0.5 volt root-mean-squared sinusoidal signal at an operating frequency of 1,000 Hz, a temperature of about 23° C., and a relative humidity of 25%.

19. A varistor comprising:

a monolithic body comprising a plurality of dielectric layers stacked in a Z-direction that is perpendicular to a longitudinal direction, the monolithic body having a first end and a second end that is spaced apart from the first end in the longitudinal direction;

a first external terminal disposed along the first end;

a second external terminal disposed along the second end;

a first plurality of electrodes connected with the first external terminal and extending from the first end towards the second end of the monolithic body; and a second plurality of electrodes connected with the second external terminal and extending from the second end towards the first end of the monolithic body;

wherein at least one of the first external terminal or the second external terminal comprises a conductive polymeric composition; and wherein the varistor can withstand greater than about 5 mm of deflection for at least about 60 seconds when subjected to a board flex test according to AEC-Q200-005 without mechanical failure.

20. A varistor comprising:

a monolithic body comprising a plurality of dielectric layers stacked in a Z-direction that is perpendicular to a longitudinal direction, the monolithic body having a first end and a second end that is spaced apart from the first end in the longitudinal direction;

a first external terminal disposed along the first end;

a second external terminal disposed along the second end;

a first plurality of electrodes connected with the first external terminal and extending from the first end towards the second end of the monolithic body; and a second plurality of electrodes connected with the second external terminal and extending from the second end towards the first end of the monolithic body;

wherein at least one of the first external terminal or the second external terminal comprises a conductive polymeric composition; and wherein the varistor exhibits a change in leakage current that is less than about 5% after being subjected to a board flex test according to AEC-Q200-005 with a deflection of about 5 mm for at least about 60 seconds.

21. A varistor comprising:

a monolithic body comprising a plurality of dielectric layers stacked in a Z-direction that is perpendicular to a longitudinal direction, the monolithic body having a first end and a second end that is spaced apart from the first end in the longitudinal direction;

a first external terminal disposed along the first end;

a second external terminal disposed along the second end;

a first plurality of electrodes connected with the first external terminal and extending from the first end towards the second end of the monolithic body; and a second plurality of electrodes connected with the second external terminal and extending from the second end towards the first end of the monolithic body;

wherein at least one of the first external terminal or the second external terminal comprises a conductive polymeric composition; and wherein the varistor exhibits a change in capacitance that is less than about 5% after being subjected to a board flex test according to AEC-Q200-005 with a deflection of about 5 mm for at least about 60 seconds.

22. A varistor comprising:

a monolithic body comprising a plurality of dielectric layers stacked in a Z-direction that is perpendicular to a longitudinal direction, the monolithic body having a first end and a second end that is spaced apart from the first end in the longitudinal direction;

a first external terminal disposed along the first end;

a second external terminal disposed along the second end;

a first plurality of electrodes connected with the first external terminal and extending from the first end towards the second end of the monolithic body; and a second plurality of electrodes connected with the second external terminal and extending from the second end towards the first end of the monolithic body;

wherein at least one of the first external terminal or the second external terminal comprises a conductive polymeric composition; and wherein the varistor exhibits a change in breakdown voltage that is less than about 5% after being subjected to a board flex test according to AEC-Q200-005 with a deflection of about 5 mm for at least about 60 seconds.

23. A varistor comprising:

a monolithic body comprising a plurality of dielectric layers stacked in a Z-direction that is perpendicular to a longitudinal direction, the monolithic body having a first end and a second end that is spaced apart from the first end in the longitudinal direction;

a first external terminal disposed along the first end;

a second external terminal disposed along the second end;

a first plurality of electrodes connected with the first external terminal and extending from the first end towards the second end of the monolithic body; and a second plurality of electrodes connected with the second external terminal and extending from the second end towards the first end of the monolithic body;

wherein at least one of the first external terminal or the second external terminal comprises a conductive polymeric composition; and wherein the varistor exhibits a change in breakdown voltage that is less than about 5% after being subjected to a temperature cycle test according to JESD22 Method JA-104 for at least about 3000 cycles.

* * * * *